Oct. 14, 1958   J. S. TORMEY   2,856,134
COMBINATION SOIL SHREDDER AND HORTICULTURAL HAMMER MILL
Filed Sept. 6, 1955   4 Sheets-Sheet 1
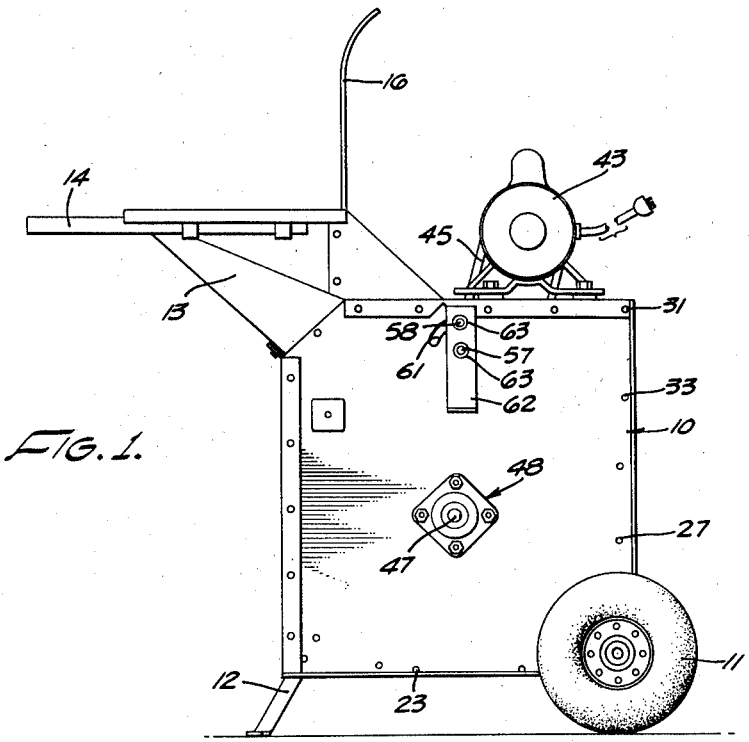
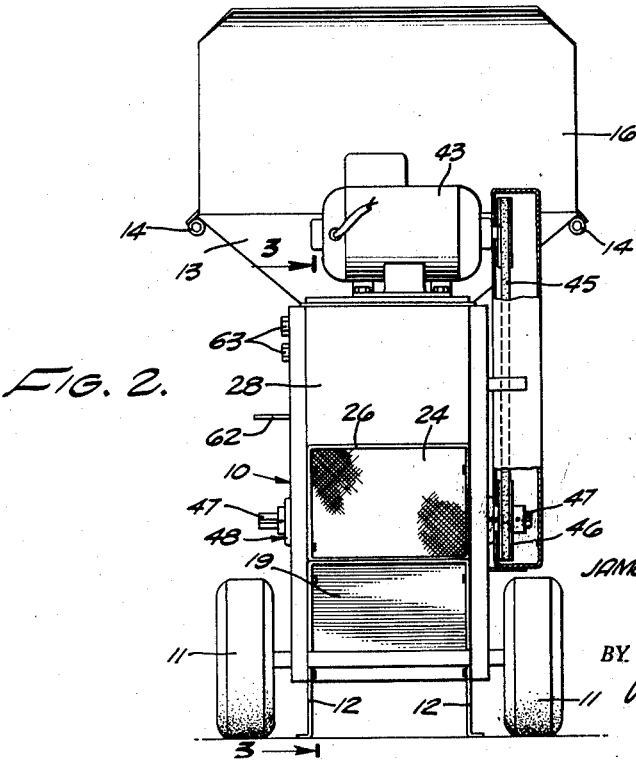
JAMES SILVESTER TORMEY
INVENTOR.
BY
ATTORNEY Oct. 14, 1958 J. S. TORMEY 2,856,134
COMBINATION SOIL SHREDDER AND HORTICULTURAL HAMMER MILL
Filed Sept. 6, 1955 4 Sheets-Sheet 2

JAMES SILVESTER TORMEY
INVENTOR.

BY
ATTORNEY

Oct. 14, 1958  J. S. TORMEY  2,856,134
COMBINATION SOIL SHREDDER AND HORTICULTURAL HAMMER MILL
Filed Sept. 6, 1955  4 Sheets-Sheet 4

JAMES SILVESTER TORMEY
INVENTOR.

BY

ATTORNEY

United States Patent Office 2,856,134
Patented Oct. 14, 1958

2,856,134

COMBINATION SOIL SHREDDER AND HORTICULTURAL HAMMER MILL

James Silvester Tormey, San Gabriel, Calif.

Application September 6, 1955, Serial No. 532,423

4 Claims. (Cl. 241—186)

The present invention relates to a combination horticultural hammer mill and soil shredder adapted to effect grinding and shredding of many types of soil, garden cuttings, vines, etc. The invention also relates to a blade or hammer construction which forms part of the soil shredder and hammer mill apparatus.

It is common practice for gardeners and greenhouse operators to prepare soil by passing it through what is known as a soil shredder, so that the lumps are all broken up into fine particles. Soil shredders for this purpose are well known, but are characterized by relatively low-speed operation and high horsepower requirement. Very importantly, conventional soil shredders are limited in their operation to the handling of soil or other fine or readily pulverizable materials, as distinguished from garden cuttings, vines, small branches, and other materials which would operate to enrich the soil if shredded and mixed therein but which, due to the lack of a means for shredding them, are normally thought of as a nuisance which must be hauled away at considerable expense.

Hammer mills are also relatively common structures which are employed to grind or crush rock, wood, waste plastic, and a wide variety of other materials. Such mills are, however, extremely large, heavy and expensive, and their use in nurseries or greenhouses, or by home owners in their gardens, would be impractical and expensive in the extreme.

In view of the above factors characteristic of soil shredders and hammer mills, it is the object of the present invention to provide a combination soil shredder and horticultural hammer mill which is light weight and inexpensive to construct, is safe and effective in its operation, and is operative to shred or grind a wide variety of materials including soil, branches, vines, and garden cuttings.

A further object of the invention is to provide a grinding and soil shredding device which a gardener or home owner may employ not only to shred soil for gardening purposes but also to grind or shred garden cuttings at or after the time they are cut, so that such cuttings are either returned immediately to the soil where they act as fertilizer, or are greatly reduced in bulk so that the problem of storing and removing them is minimized.

An additional object of the invention is to provide a novel blade or tooth structure which operates with a combined hammer and shear action to provide extremely effective shredding and grinding with a minimum of power and with minimum danger of clogging.

Another object of the invention is to provide an apparatus which operates at extremely high speed as compared to conventional structures, and which may be selectively or simultaneously employed as a soil shredder and hammer mill to provide highly efficient shredding, grinding, and cutting operations with minimized possibility of clogging of the apparatus.

These and other objects and advantages of the invention will be more fully set forth in the following specification and claims considered in connection with the attached drawings to which they relate.

In the drawings:

Figure 1 is a side elevational view of a combination soil shredder and horticultural hammer mill embodying the present invention;

Figure 2 is an end elevation of the forward or outlet end of the apparatus, as viewed from the right in Figure 1;

Figure 3:
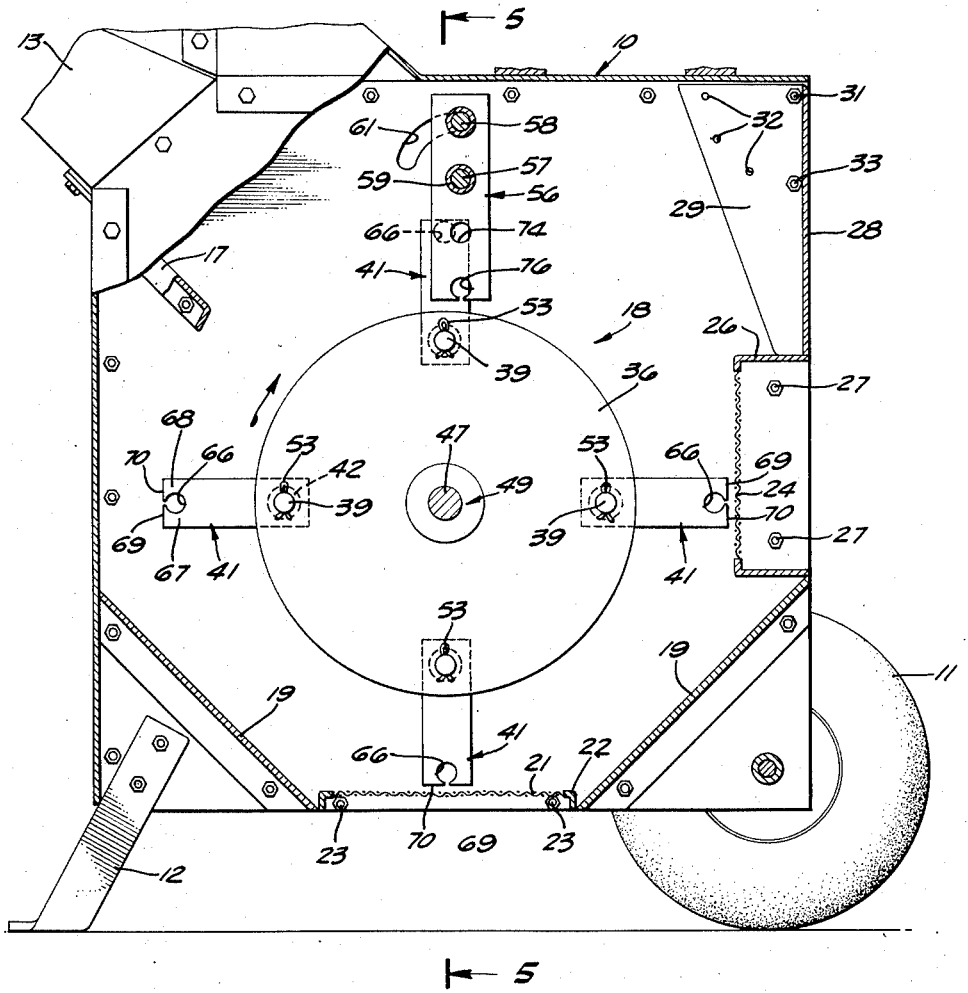
Figure 3 is an enlarged longitudinal sectional view taken along line 3—3 of Figure 2 showing the grinding screens in position.

Referring now to the drawings and particularly to Figures 1 and 2 thereof, the apparatus of the invention may be seen to comprise a generally rectangular housing 10 supported by a pair of wheels 11 at its lower forward corner and by legs 12 at opposite sides of its lower rear corner. Provided at the upper rear corner of housing 10 is a feed hopper 13 having a handle 14 mounted thereon, the handle being adapted to be employed to lift legs 12 off the ground and move the apparatus on the wheels 11. The housing 10 and hopper 13 are preferably formed of relatively heavy gauge sheet metal components which are secured together as by bolting or riveting.

A deflecting plate 16 is mounted so as to project upwardly, and preferably vertically, from the forward wall of feed hopper 13. This plate is adapted to have shovelfuls of soil thrown against it by the operator of the apparatus, the force of the throw then operating to provide an initial lump-breaking action prior to feeding of the soil through feed hopper 13 into housing 10. Additionally, and importantly, the presence of the deflecting plate means that the operator need not turn over his shovel each time he introduces a shovelful of soil into the apparatus. Projections or spikes, not shown, may be mounted on the forward face of deflecting plate 16, if desired, in order to aid in the above-described initial lump-breaking action.

Referring next to Figure 3 in particular, the feed hopper 13 may be seen to include an inclined chute plate 17 down which the soil and other material introduced into the apparatus slides. Plate 17 terminates at a lower edge disposed rearwardly adjacent the upper portion of the rotor 18 of the apparatus. At the lower corners of the housing 10 are mounted inclined walls or baffles 19, these elements cooperating with the vertical rear wall of housing 10, and with the horizontal upper wall of housing 10 forwardly of feed hopper 13, to provide a chamber within housing 10 which may be either substantially closed or largely open as will next be described.

It will be noted upon reference to Figure 3 that a bottom grate or screen 21, shown as enclosed in a metal frame 22, is mounted horizontally between the lower edges of walls 19 as by means of bolts 23 extending into the side walls of the housing. Similarly, a front grate or screen 24 enclosed by a metal frame 26 is mounted in vertical arrangement above the upper edge of the front one of walls 19, also by means of bolts 27 extending into the housing side walls. These grates or screens 21 and 24 form the grinding elements against which hammer portions of the rotor 18 operate as will be described hereinafter. Mounted above the upper edge of grate 24 and its frame 26 is an adjustable directing hood 28 having side flanges 29, the latter being pivotally mounted on the housing side walls as by bolts 31 located at the upper forward corner of the housing. Directing hood 28 may be adjusted to a number of positions including the one shown in Figure 3, at which its lower edge is closely adjacent the upper edge of frame 26 to provide a further means of forming a substantially closed chamber within housing 10, and the one shown in Figure 6 at which the hood 28 is directed forwardly and acts to limit the area out which material is thrown by rotor 18 when no front grate or screen 24 is employed. To provide the described adjustment, side flanges 29 are formed with a number of arcuately spaced holes 32 which are selectively adapted to receive bolts 33 extending into the housing side walls.

Figure 6:
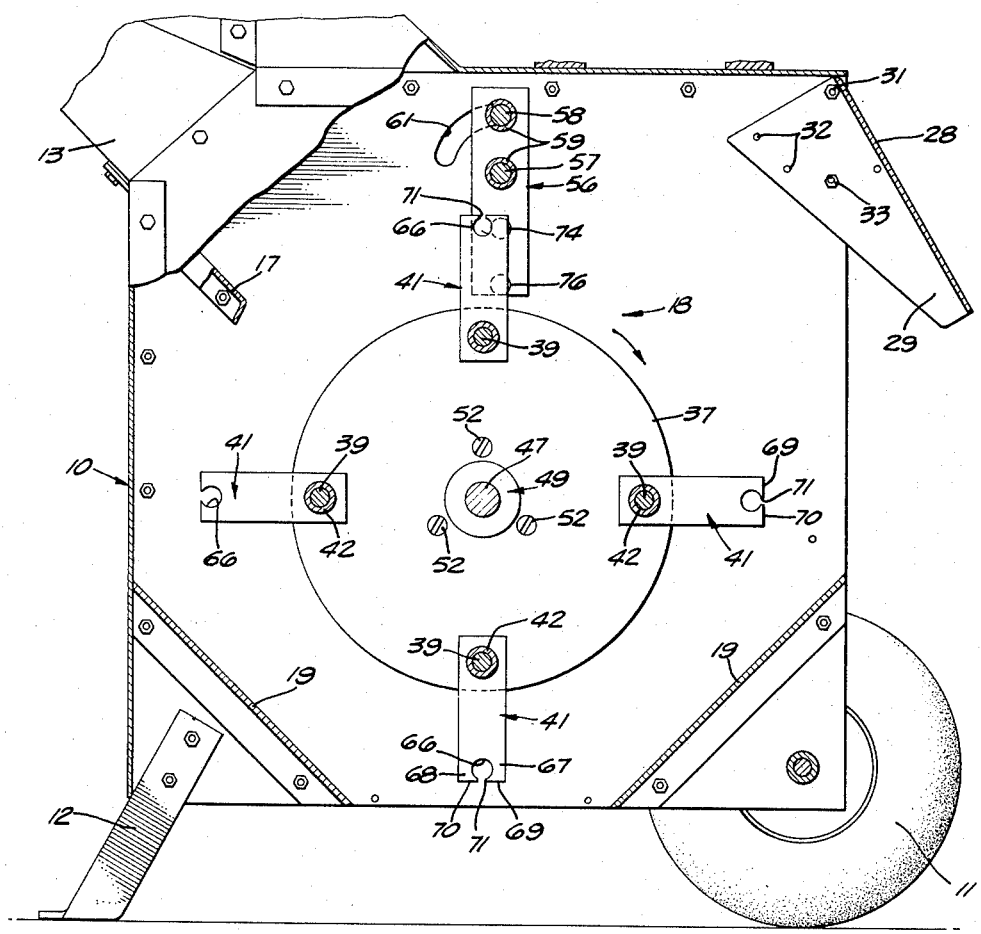
Figure 6 is a view corresponding to Figure 3 but showing the apparatus with the grinding screens removed.

When the housing is arranged as shown in Figure 3, with both screens 21 and 24 in place and with the hood 28 disposed vertically, a fully closed chamber is provided so that the only exit openings are through the screens. This is the full hammer mill operation and involves a grinding action between the ends of teeth portions of rotor 18 and the grates or screens 21 and 24. When the housing is adjusted as shown in Figure 6, with both screens removed and with hood 28 inclined outwardly, the apparatus acts more as a cutter and shredder instead of as a hammer mill. The cut and shredded material then is thrown out the forward opening in housing 10 below hood 28, and to a much lesser extent out the opening in the bottom of the housing between the lower edges of wall elements 19. It is to be understood that only one screen may be employed instead of two, and that the hood 28 may be adjusted to any desired position to regulate the area out which material is thrown by the rotor.

Figure 5:
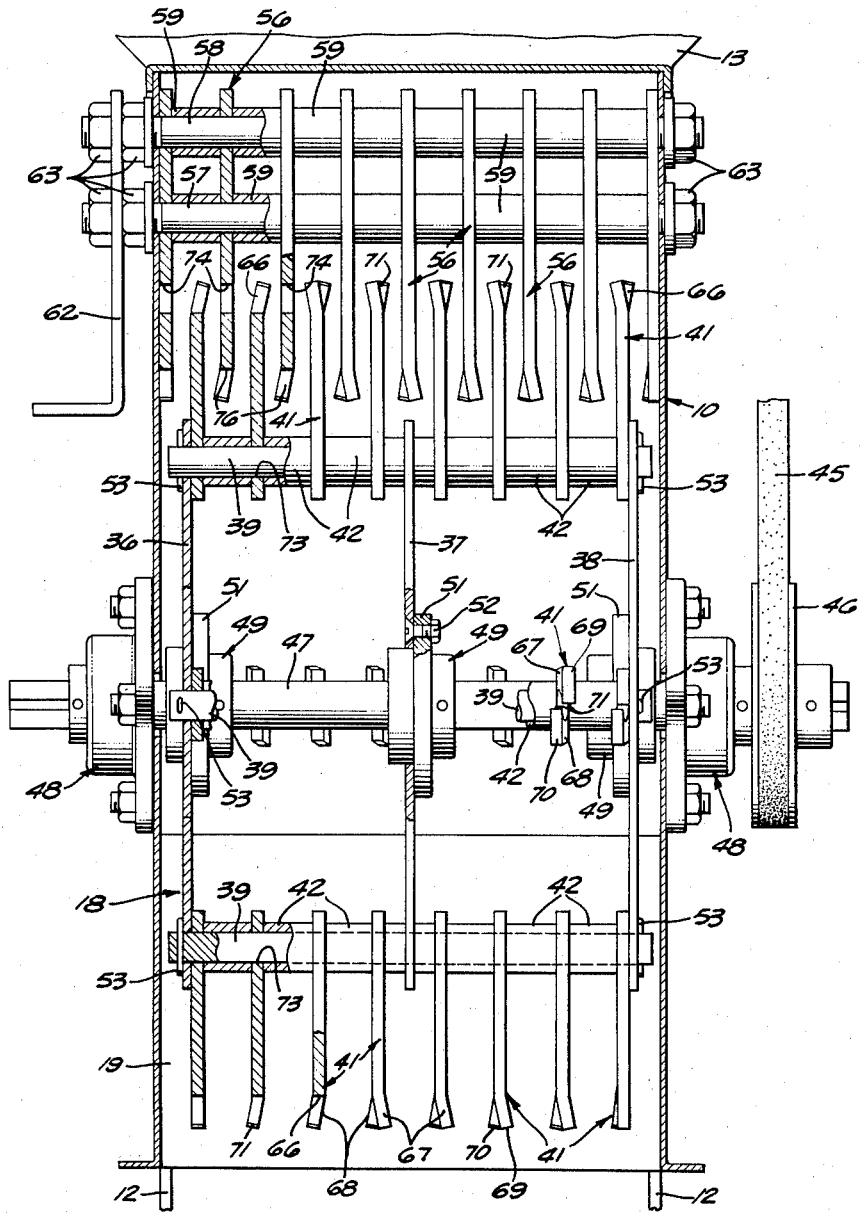
Figure 5 is a transverse central sectional view taken along line 5—5 of Figure 3 and illustrating the cooperating stationary and movable blades or hammers of the apparatus.

Proceeding next to a description of the extremely important rotor element 18, and referring particularly to Figure 5, that element comprises three axially spaced discs 36–38 having four connecting rods 39 inserted through the peripheries thereof at ninety degree intervals. Mounted in equally spaced relationship along each rod 39 are a plurality of hammers, teeth, blades or tines 41 which are maintained in spaced relationship by suitable collars or lugs 42 on the rod 39. The blades or hammers 41 may pivot freely on their respective connecting rods 39, and are caused to assume the illustrated radial positions due to centrifugal force created by rotation of rotor 18.

Rotation of the discs 36–38 and thus of the rotor blades 41 is effected by a motor 43, which may be either electric or gasoline powered and is mounted on the upper portion of housing 10 as shown in Figures 1 and 2. The motor is connected through a belt 45 to a pulley 46 (Figure 5) on the outer end of a shaft 47, the latter being journaled centrally of the side walls of housing 10 in suitable bearings 48. Pinned at axially spaced points along shaft 47 are mounting elements 49 having radial flanges 51 against which the apertured central portions of discs 36–38 are adapted to abut for securing as by bolts 52.

The described construction is extremely strong, and eliminates the danger that one or more of the hammers 41 may fly out of place with resultant possibility of injury to the operator or other persons. In particular, the use of discs 36–38 instead of angular plates eliminates the wear at corners which has, in the past, resulted in rotor weakness and likelihood of damage and injury. Also, the ends of the connecting rods 39 are disposed sufficiently close to the side walls of housing 10 that, should cotter pins 53 which hold them in position break, the connecting rods would nevertheless not slide out of the discs 36–38 but would instead engage and be blocked by the housing side walls.

Mounted above the rotor 18 is a bank or row of stationary teeth, blades or tines 56 which are so arranged as to overlap the radially extending rotor hammers 41 and to be disposed respectively therebetween as illustrated in Figure 5. The stationary blades 56 are preferably mounted by means of a pair of parallel rods 57 and 58 which extend through apertures in the upper portions of the respective blades, there being spacer collars or lugs 59 provided to maintain the stationary teeth in the proper positions. The lower rod, numbered 57, extends through apertures in both side walls of housing 10, whereas the upper rod, numbered 58, extends through corresponding arcuate slots 61 provided in the housing side walls. The lower rod 57 therefore acts as a pivot about which the teeth 56 and upper rod 58 may rotate, a crank 62 being provided for this purpose as best shown in Figure 5. Suitable nuts 63 are provided at both ends of the rods 57 and 58 to tighten the rods in the desired adjusted positions at all times except during the adjustment operation.

Figure 7:
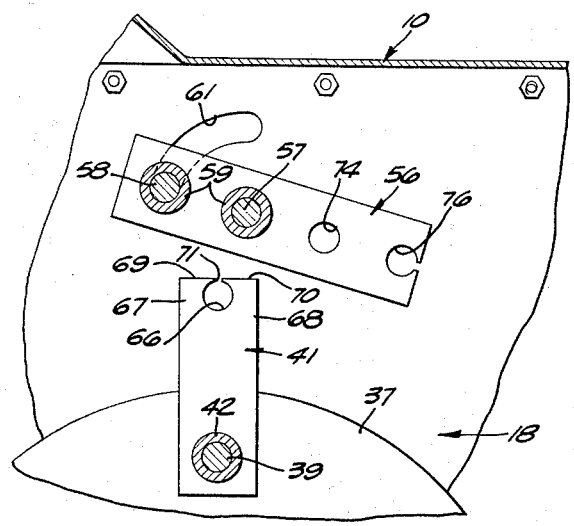
Figure 7 is a fragmentary illustration of the upper portions of Figures 3 and 6, but showing the stationary blades as pivoted out of operative position.

In normal operation, the stationary teeth or blades 56 are adjusted to the vertical position shown in Figures 3 and 6 of the drawings, there then being the maximum amount of overlapping between the stationary and rotor blades. Such operation produces the maximum amount of cutting or shredding of material passed through the apparatus. When it is desired to effect a lesser amount of cutting or shredding, the nuts 63 are loosened and crank 62 turned to locate the stationary teeth or blades 56 at the desired angle and forwardly inclined relative to the rotor 18, the latter rotating clockwise as shown in Figures 3 and 6. The amount of overlapping is then decreased with consequent lessening in the amount of shredding and cutting. Should the teeth become clogged, it is merely necessary to pivot the stationary blades to the extreme forward position shown in Figure 7, at which time the rotor blades are completely free and it is very simple to eliminate the clogged condition.

Figure 4:
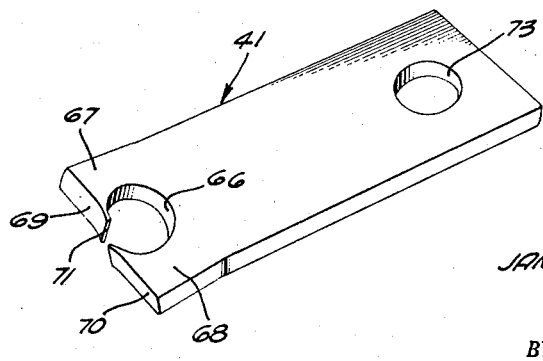
Figure 4 is an enlarged perspective view of one of the blades or hammers of the apparatus.

Referring especially to Figure 4, wherein a single rotor blade or hammer is shown in perspective, it is very important to the invention that the outer end of the blade be bifurcated and also twisted or offset so as to provide both cutting and shearing elements, and also to increase the effective end area adapted to operate against the screens or grates 21 and 24. More particularly, each blade 41 is formed adjacent its extreme outer end with a round hole 66 located approximately midway between the side edges of the blade. A cut is made through the metal at the outer portion of the hole 66, and the resulting bifurcations 67 and 68 are bent, twisted or offset in opposite directions. As best shown at the right central portion of Figure 5, the amount of bending or offsetting is such that the end faces 69 and 70 of the respective bifurcations 67 and 68 both abut, at their inner edges, a plane which is parallel to and midway between the side faces of each blade or hammer 41. The hole 66 has a diameter on the order of half the width of the blade.

The described construction not only results in an increase in the effective width of the end of the blade (which operates against the screens 21 and 24) by a factor of two, but also forms sharp cutting edges 71 at the outer blade ends. It is to be understood that when the forward one of these cutting edges 71 becomes dull it is merely necessary to reverse the blade 41 in order to make the remaining edge the forward and operative one.

The remaining hole in each rotor blade or tooth 41, at the inner end of the blade, is the one adapted to receive the connecting rod 39 and has been given the number 73 in Figure 4.

The lower portions of the stationary teeth or blades 56 are identical to the outer portions of rotor blades 41, and therefore will not be described in detail herein. The stationary blades 56 also, of course, are provided with holes for the rods 57 and 58 which mount the same. In addition, the stationary blades are provided with holes 74 which, when the stationary blades 56 are in their vertical positions, are at exactly the same elevation as, and register with, the holes 66 in the outer ends of the rotor blades. Furthermore, the holes 74 have generally the same diameters as the holes 66. The holes at the lower ends of the stationary blades 56, and corresponding to the holes 66 in the rotor blades, have been given the number 76.

Before proceeding with a description of the operation of the combined soil shredder and horticultural hammer mill, it will be explained that the rotor 18 should be rotated at relatively high speeds, as compared to conventional soil shredders and the like, in order to effect optimum results for all types of operation. Thus, the motor 43 and associated pulleys are so designed that rotor 18 will operate in the neighborhood of 2,000 R. P. M., as distinguished from about 700 R. P. M. as is the case with a number of presently known commercial shredders. This high-speed operation is one of the important factors which make possible the greatly improved results achieved with the present apparatus.

In the operation of the present apparatus, let it first be assumed that it is desired to effect relatively coarse shredding or cutting of a material such as soil, branches, cuttings, vines, etc. The apparatus is then set up as shown in Figure 6, there being no screens 21 or 24 employed. However, if desired, a solid plate may be mounted over the bottom opening in housing 10 in place of the screen 21 and its frame 22. The motor 43 is then set in operation to effect rotation of rotor 18, and in a clockwise direction as previously indicated. A material such as soil is then shoveled into the hopper 13 by throwing it against the deflecting plate 16, after which it slides down the chute 17 and comes in contact with the rapidly rotating rotor 18. The soil is first picked up by the teeth 41 shown at the left in Figure 6, and then brought around clockwise through the stationary blades 56, after which it is thrown out through the portion of the front opening not blocked by hood 28. As it passes through the stationary blades 56, the combined hammering and shearing action effected by the blades, together with the cutting action caused by the cutting edges 71 of the blades, results in an efficient pulverizing of the soil.

It is frequently the case that soil fed through a soil shredder contains rocks, bricks, broken flower pots and other undesirable material which has in the past resulted in clogging of the shredders. With the present apparatus, however, a great majority of such material will actually be ground up by the combined action of the rotor and the bank of stationary blades, because of the novel tooth construction described above. It is to be understood that the rotor blades are, as shown in Figure 5, spaced away from the adjacent stator blades by a distance slightly more than the width of each blade. Thus, when a rock, for example, is fed through the machine it may very well tend to wedge itself between the rotor and stator blades and in a manner sufficiently tight to cause jamming and stalling of the motor. Such action is, however, prevented due to the presence of the holes 74, 76, and 66 since the rocks, etc., tend to enter these holes and relieve the jamming or wedging pressure on the blades. After the rocks have entered the holes the rotor blades chip them away with a combined cutting, shearing and hammering action until they are sufficiently small to pass through the device. In this way the presence of the openings 66, 74 and 76 makes it possible to use a motor 43 having lower horsepower than is conventional with commercial soil shredders.

When materials such as small branches, vines, etc., are fed through the device, these are brought against the stationary blades 56 due to the action of the movable blades 41, after which the rotor blades cut and hammer them until they are sufficiently small to pass between the stator blades 56 and be thrown out of the apparatus. It has been discovered that material such as vines may be fed through the device without winding around the rotor and causing jamming, this being largely due to the effects of the improved blade construction as well as to the high-speed operation.

When it is desired to effect a lesser degree of cutting or shredding, or in the event jamming does occur, stationary blades 56 are merely rotated forwardly by loosening the nuts 63 and turning the crank 62 as previously stated.

Let it next be assumed that it is desired to effect relatively fine grinding or pulverizing of a material such as small branches. The screens 21 and 24 are then mounted in position as shown in Figure 3, and the hood 28 is moved to its vertical position at which it blocks the exit of material above the screen 24. The material to be pulverized is then fed into the hopper 13 as before, and is subjected to an initial cutting and hammering action due to the above described operation of the blades 41 and 56. Thereafter, the material is brought down into the bottom front portion of the housing 10 where it is subjected to a continuous action by the end faces 69 and 70 of hammers 41, as well as by the cutting edges 71 thereof. Preferably, the end faces 69 and 70 are spaced a slight distance away from the screens, as shown in Figure 3, but a compressing and rubbing action is nevertheless effected which causes disintegration of the material until it is sufficiently small to pass through the screens. As previously stated, the twisting of the bifurcations 67 and 68, to cause the end faces 69 and 70 to be offset, results in increased blade thickness and in very efficient hammer mill operation.

As above described, the apparatus has a very wide variety of uses in addition to its soil shredding function. Thus, a gardener or home owner may readily wheel the apparatus along with him while he trims roses, or bushes, etc., and then feed the clippings into the apparatus so that they may be ground up and returned to the soil as compost. If it is not desired to return the material to the soil a whole pile of clippings may be fed through the apparatus, which results in a very great decrease in the bulk thereof so that problems of storage and removal are minimized.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A combination soil shredder and horticultural hammer mill, which comprises a housing having an end opening therein, a rotor mounted in said housing and having a plurality of radially extending rotor blades, a row of stationary blades mounted in said housing and extending generally toward said rotor, said stationary blades and said rotor blades being provided with registered recesses adapted to receive rocks and similar jamming materials in order to relieve jamming pressures between said stationary and rotor blades, means for manually adjusting said stationary blades to different fixed operating positions, said stationary blades being overlapped with and disposed respectively between said rotor blades so as to provide a hammering and cutting action upon rotation of said rotor, a grate or screen mounted across said end opening and adapted to cooperate with the outer ends of said rotor blades to provide a hammer mill action, and motor means to rotate said rotor.

2. A shredding and cutting machine, which comprises a housing having an intake opening at one end portion and an outlet opening at another end portion, a rotor journaled transversely in said housing generally between said intake and outlet openings, said rotor including a plurality of arcuately spaced pivot bars extending transversely of said housing, a plurality of relatively flat elongated rotor blades freely journaled at one end on said pivot bars at spaced points therealong, said blades lying in planes transverse to said pivot bars and having outer end portions which are directed radially outwardly due to the effects of centrifugal force as said rotor is turned, said outer end portions being bifurcated and the bifurcations being offset to provide cutting edges, a row of stationary blades mounted in generally vertical arrangement above said rotor, said stationary blades also lying in planes transverse to said pivot bars and overlapping and alternating with said outer end portions of said rotor blades, said rotor and stationary blades being spaced apart by about the thickness of one blade and formed with registered openings adapted to receive rocks and the like to thus prevent binding and jamming of the rotor, and power means to rotate said rotor, and means for moving said stationary blades as a group into and out of greater and lesser overlapping relation with respect to said rotating blades and for locking said stationary blades in a desired position of overlap whereby the trapping of an oversize particle between said relatively moving blades causes the engaging rotating blades to pivot counter to the direction of blade rotation to by-pass the particle while leaving the remaining blades undisturbed.

3. A soil pulverizer and horticultural hammer mill comprising a housing having a material feeding hopper opening through one wall thereof and at least one discharge therefrom, a rotor mounted for rotation in said housing and having a plurality of rows of blades each pivotally supported on axes parallel to said rotor axis, means accurately spacing the blades in each row and holding the similarly positioned blades of all rows in a common plane normal to the rotor axis, a set of stationary blades forwardly of the upper transverse discharge edge of said hopper, said stationary blades being adjustable to different fixed operating positions and disposed in parallel planes spaced between the planes of rotation of said rotor blades, said stationary blades being cooperable with said rotor blades in disecting material fed into said mill through said hopper, said rotating and stationary blades each having an opening therethrough, with those in the rotating blades positioned to overlap with those in the stationary blades whereby material caught between openings of said relatively moving blades is trapped between the oppositely converging walls of said openings and disintegrated.

4. A soil pulverizer and horticultural hammer mill as defined in claim 3 wherein the free end portions of said blades are provided with opposed cutting edges extending crosswise of the direction of relative movement, the supporting portion of said cutting edges being offset in opposite directions with respect to the plane of rotation.

References Cited in the file of this patent

UNITED STATES PATENTS

| | | |
|---|---|---|
| 843,428 | Ancel | Feb. 5, 1907 |
| 963,224 | Hess | July 5, 1910 |
| 973,761 | Cline | Oct. 25, 1910 |
| 1,025,480 | Pack | May 7, 1912 |
| 1,317,769 | Williams | Oct. 7, 1919 |
| 1,975,406 | Reschke | Oct. 2, 1934 |
| 2,009,957 | Esch | July 30, 1935 |
| 2,353,836 | Lindig | July 18, 1944 |
| 2,619,294 | Mullner | Nov. 25, 1952 |